(12) United States Patent
Gonsalves

(10) Patent No.: US 6,704,445 B1
(45) Date of Patent: Mar. 9, 2004

(54) SPIKE TOLERANT HISTOGRAMS

(75) Inventor: Robert A. Gonsalves, Wellesley, MA (US)

(73) Assignee: Avid Technology, Inc., Tewsbury, MA (US)

( * ) Notice: Subject to any disclaimer, the term of this patent is extended or adjusted under 35 U.S.C. 154(b) by 600 days.

(21) Appl. No.: 09/657,990

(22) Filed: Sep. 8, 2000

(51) Int. Cl.⁷ .................................................. G06K 9/00
(52) U.S. Cl. ...................................... 382/168; 345/660
(58) Field of Search ................................ 382/168, 172, 382/203, 298; 345/440, 440.1, 440.2, 660, 667; 324/121 R

(56) References Cited

U.S. PATENT DOCUMENTS

| | | | |
|---|---|---|---|
| 4,236,151 A | * 11/1980 | Russ et al. ................ | 345/440.1 |
| 4,667,228 A | 5/1987 | Kawamura et al. | |
| 4,941,037 A | 7/1990 | Sasaki et al. | |
| 5,138,252 A | * 8/1992 | Ferguson .................... | 345/440 |
| 5,495,168 A | * 2/1996 | de Vries ................ | 324/121 R |
| 5,748,802 A | 5/1998 | Winkelman | |
| 5,774,191 A | 6/1998 | Iverson | |
| 5,874,988 A | 2/1999 | Gu | |
| 5,995,248 A | 11/1999 | Katori et al. | |
| 6,118,550 A | 9/2000 | Hayashi | |
| 6,154,288 A | 11/2000 | Watanabe | |
| 6,192,163 B1 | 2/2001 | Murayama | |
| 6,215,914 B1 | 4/2001 | Nakamura et al. | |

OTHER PUBLICATIONS

Envi Tutorial #1, Introduction of Envi, Copyright 1993–1998, pp. 1–15.
Symphony Color Correction Guide, Release 2.1, Avid Technology, Inc., Oct. 1999, pp. i–7–14.

* cited by examiner

*Primary Examiner*—Phuoc Tran
(74) *Attorney, Agent, or Firm*—Peter J. Gordon

(57) ABSTRACT

A computer system is provided such that histograms are displayed in a histogram window according so that a spike in the histogram that is significantly larger than the other histogram values is not used as the scaling factor for displaying the histogram. Rather, a histogram value other than the largest histogram value is used to scale the histogram in the histogram window. Consequently other peaks in the histogram are emphasized in the display and the largest peak does not dwarf the other peaks due to the scaling used to fully represent the largest peak.

23 Claims, 7 Drawing Sheets

SPIKE TOLERANT HISTOGRAMS

Color correction devices for color images generally provide a mechanism through which color characteristics may be adjusted. The image to be corrected and sometimes a histogram or other representation of the distribution of color in the image typically are displayed to a user. Histograms generally are provided for each component of component video data. Color correction devices typically show the input image prior to correction and its color distribution histogram. After adjustments are made to the color, an output image is generated. A histogram also may be generated for and displayed with the displayed output image.

A histogram is typically a scaled presentation, which shows in a relative manner the color proportions for the image. If one color is found in the image to a more significant degree than the other colors, the histogram will reflect this and a large spike will occur at the dominant color. The scaling will de-emphasize the presence of the other colors in the image. For example, if an image is cropped with a black border at the top and bottom of the image (the "letter-box" effect), the histogram will show a large spike for the color black and de-emphasize the portion of the graph associated with the colors in the actual image. This effect makes the histogram difficult to read and comprehend. This is, of course, the opposite of our intent. It is thus desirable to provide for a method and system for generating a color histogram of an image that is easy to read and comprehend, even when the image is dominated by only a few colors.

SUMMARY

Histograms are displayed in a histogram window according to the present invention such that a spike in the histogram that is significantly larger than the other histogram values is not used as the scaling factor for displaying the histogram. Rather, a histogram value other than the largest histogram value is used to scale the histogram in the histogram window. Consequently other peaks in the histogram are emphasized in the display and the largest peak does not dwarf the other peaks due to the scaling used to fully represent the largest peak.

DETAILED DESCRIPTION

The following detailed description should be read in conjunction with the attached drawing in which similar reference numbers indicate similar structures. All references cited herein are hereby expressly incorporated by reference.

Figure 1:
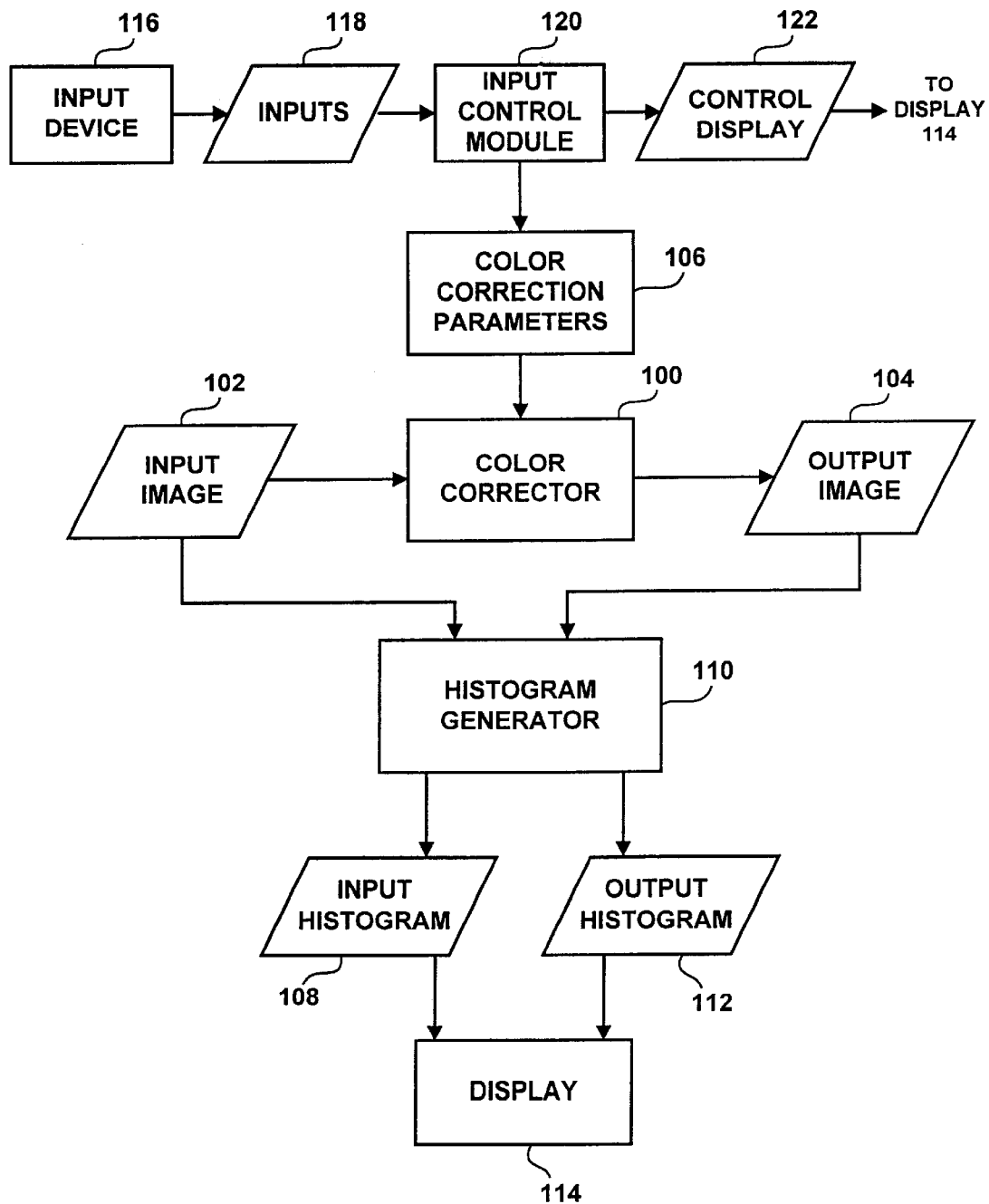
FIG. 1 is a data flow diagram illustrating how histograms and a control display may be generated for a color corrector.

Referring now to FIG. 1, a color corrector 100 receives an input image 102 to produce an output image 104 according to color correction parameters 106. A histogram generator 110 generates an input histogram 108 from the input image 102. Histogram generation is described, for example, in *Digital Image Processing*, Second Edition., by Rafael Gonzales, Addison-Wesley, 1987, pages 144–146 and page 149. The same or another histogram generator 110 also produces an output histogram 112 from the output image 104. The input and output histograms may be output to a display 114. A user also may manipulate an input device 116 to provide inputs 118 according to which an input control module 120 adjusts the color correction parameters 106. The input control module 120 generates a control display 122, which also may be displayed on the display 114. The displayed input and output histograms and the control display, in response to signals from the input device, provide a graphical user interface for color correction.

Figure 2A:
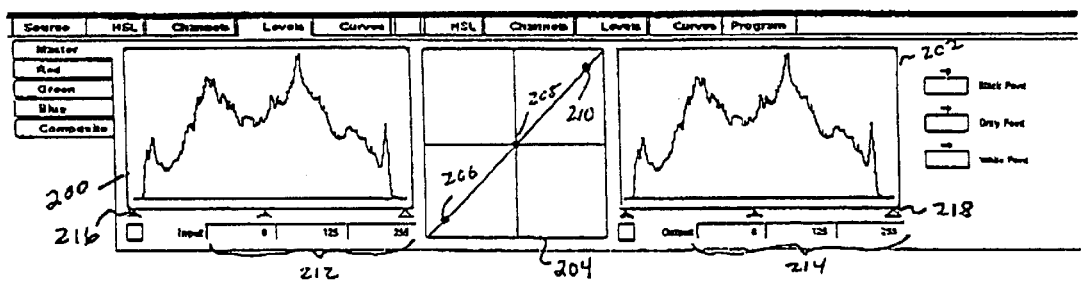
FIGS. 2A and 2B illustrate an example user interface having input and output histograms and a control display.

An example graphical user interface will now be described in connection with FIG. 2A. Both the input histogram 108 and output histogram 112 are organized in a window on the display 114 with the control display 122. This example display may be used to illustrate histograms for component video data such as red, green, blue and master color video data. Component video data in other color spaces such as YCrCb and HSL also may be represented using this interface. In FIG. 2A, an input region 200 illustrates the input histogram. An output region 202 illustrates the output histogram. A control region 204 provides a mechanism through which the color correction parameters 106 (FIG. 1) may be set. In this example, the control region 204 displays three control points 206, 208 and 210 that are controlled by a user to set a white point, gray point and black point, respectively. For example, the position of these control points on the display may be controlled using conventional techniques using a cursor control device, such as a mouse, trackball, touch pad or touch screen. Numerical values associated with these control points may be displayed, such as shown at 212 and 214. These values also may be shown graphically and in association with the histogram regions 200 and 202 such as shown at 216 and 218. These control points are translated using conventional techniques into color correction parameters 106 for red, green and blue video levels to be used by the color corrector 100.

Figure 2B:
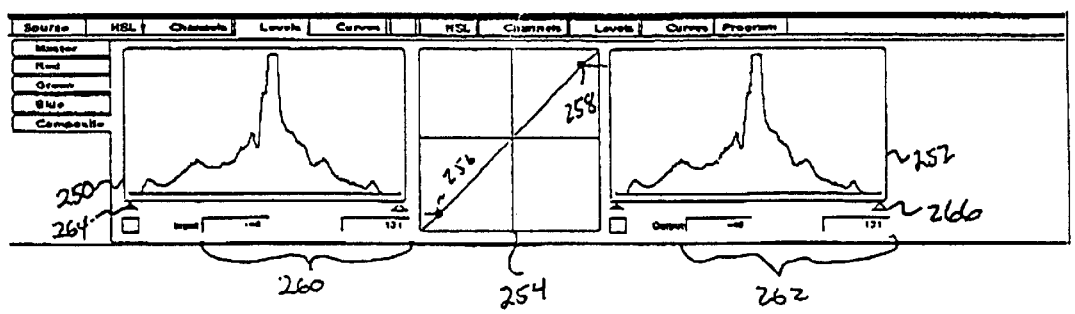

Referring now to FIG. 2B, an example organization in a window of input and output histograms and a control display for a composite video signal is shown. In particular, an input region 250 illustrates an input histogram of the composite signal corresponding to the input image. An output region 252 illustrates an output histogram of the composite signal corresponding to the output image. A control region 254 provides a mechanism through which composite video levels may be set, which are translated into color correction parameters (106 in FIG. 1). In this example, the control region 254 displays two control points 256 and 258 that are controlled by a user to set minimum and maximum composite video levels, respectively. The position of these control points on the display may be controlled in the same manner as the control points in FIG. 2A. Numerical values associated with these control points may be displayed, such as shown at 260 and 262. These values also may be shown graphically and in association with the histogram regions 250 and 252, such as shown at 264 and 266. These control points are translated using conventional techniques into color correction parameters 106 for composite video levels to be used by the color corrector 100.

Figure 3:
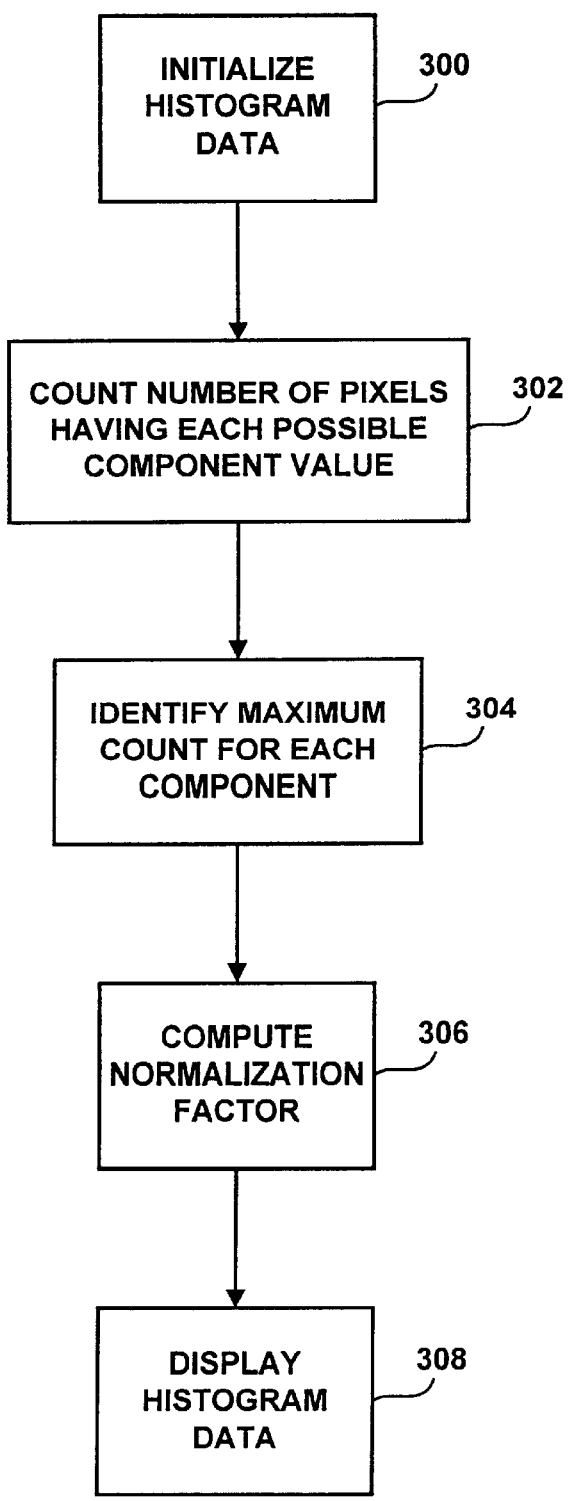
FIG. 3 is a flow chart illustrating how an input histogram for an input image having component video data may be generated.

FIG. 3 is a flow chart describing in one embodiment how an input histogram for an input image defined by component video data may be generated. In step 300, the histogram data are initialized. For example, for each of the possible values of each of the possible components of a pixel in an input image, a count of the pixels having that value for the component is set to zero. The counts for each possible component value may be stored in an array indexed by the component value. Next, in step 302, the number of pixels having each possible component value is counted. For example, for each pixel in the image, its representation may be converted to component values in the R, G, B color space. For example, a set of values in the Y, Cr, Cb color space for a pixel is converted into a set of values in the R, G, B color space. The value of each component for the pixel is used to index the count for that component in an array representing the histogram data. The count for that component value is incremented. The maximum count for each component then is identified from the histogram data in step 304. For example, the component value for each component for which the count is the maximum is identified. A normalization factor for displaying the input histogram is then determined for each component in step 306. For example, a factor such as 1/(maximum*y), where y is a value close to one, such as 1.1, may be used. The count for each component value is multiplied by the normalization factor to normalize the input histogram for display in step 308.

Figure 4:
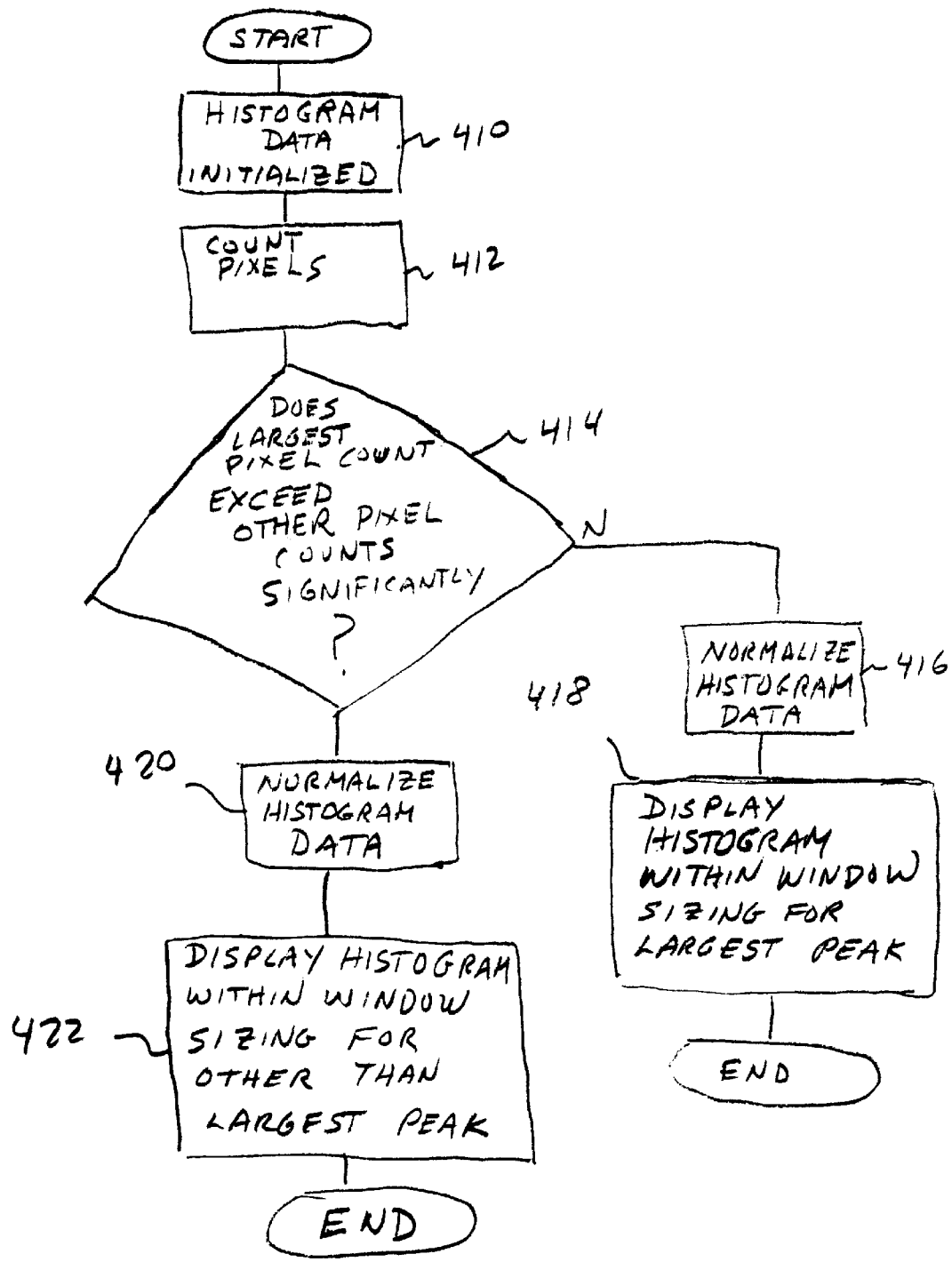
FIG. 4 is a flow chart illustrating how an output histogram for an output image may be generated.

Referring now to FIG. 4, a flow chart describing in one embodiment how output histograms for an output image defined by component video data may be generated, will now be explained. Similar to generation of the input image, the histogram data are initialized in step 410. Next, in step 412, the number of pixels having each possible component value is counted. After comparing the component counts in step 414 and determining whether the largest component count exceeds the next largest component count by a predetermined factor, a decision is made as to how the histogram data will be displayed.

If the largest component count does not exceed the next largest component count by the predetermined factor, the component counts are normalized in step 416. In one practice of the invention, the predetermined value is 1.1, and the normalization factor is (1/max component count). The histogram is next plotted in step 418 so that the color having the largest count of pixels in the image is assigned a representative value of one hundred percent (100%). The histogram is graphed, however, so that the peak value of the histogram occupies about 90% (1/1.1) of the vertical height of the histogram window. Each other component count is represented in the histogram window as a percentage relative to the color component with the largest pixel count. The other colors are then sized and plotted relative to this peak value. One of ordinary skill in the art will clearly recognize that other values can be used for the predetermined factor value and the normalization value, and the present invention is not limited to the example values used in this description.

If the largest pixel count in the histogram exceeds the next largest pixel count by a predetermined factor, the histogram is not sized within the histogram window using the color component with the largest pixel count at full scale, but rather the color component with the next largest pixel count is used. Again, the component counts are normalized in step 420 in a manner so that the maximum component count is set to one hundred percent (100%), and each other component count is represented as a percentage relative to the color component with the largest pixel count. However in this case the second largest pixel count is displayed in step 422 in the histogram window so as to occupy about 90% (1/1.1) of the vertical height of the histogram window. The color component with the largest pixel count is, of course, still plotted, but will not dwarf the display of the histogram in the histogram window. By plotting the histogram so that the second largest peak occupies about 90% of the vertical height of the window, a buffer zone is created above the peak and the significance of the largest peak is more clearly shown. One of ordinary skill in the art will recognize that other values than about 90% can used to size a peak in the histogram window, and that the present invention is not merely limited to using only the second largest peak to size the window, but rather that other peaks than the largest are used o size the histogram within the histogram window.

Figure 5:
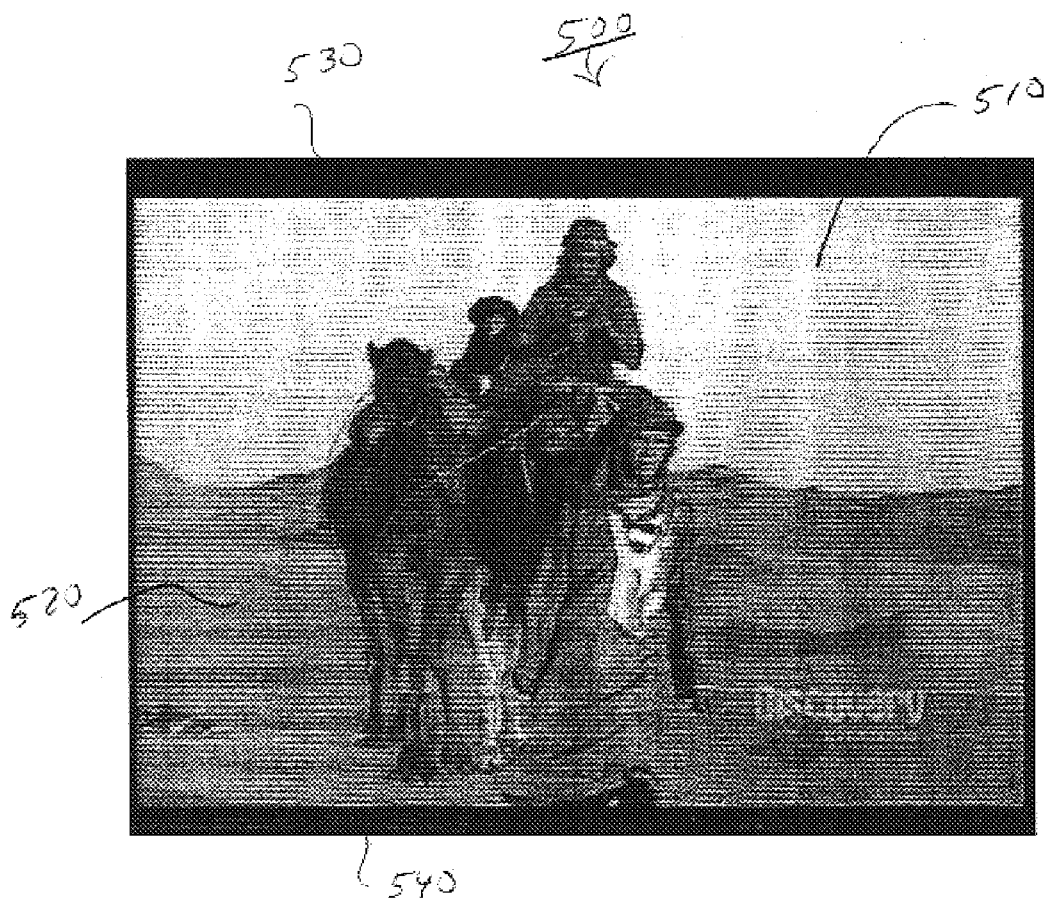
FIG. 5 is an image having cropped borders at the top and bottom of the image.

FIG. 5 will be used to further explain the present invention. FIG. 5 is an image 500 of men crossing the desert. The colors in the image are dominated by the colors of the sky 510 and the sand 520. FIG. 5 is also cropped at the top of the image with a black border 530 and at the bottom of the image with a second black border 540.

Figure 6:
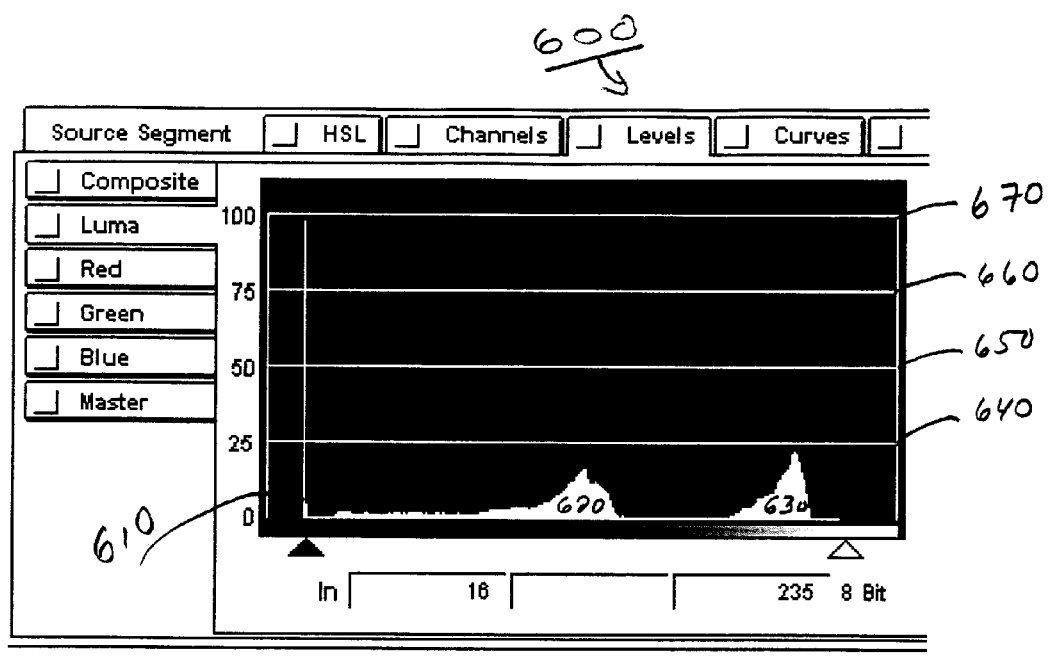
FIG. 6 is a conventional histogram graph of the color components associated with the image of FIG. 5.

FIG. 6 is a conventional histogram 600 that plots the amount of presence of each color component in the image 500, as a percentage relative to the color component with the most pixel values in the image 500. The color component with the largest pixel count is assigned a value of 100% in the histogram and the other color component values are represented as a percentage of the largest color component count. Grid lines 640, 650, 660 and 670 are optionally provided to clearly show 25% increments in the histogram scaling. One of ordinary skill in the art will appreciate that other incremental values may be provided for and still remain within the scope of the claims. In histogram 600 it is clearly seen that because of the cropping at the borders, the histogram is dominated at one color component which is shown as the spike at 610. When plotted in FIG. 6, the other significant color component values represent the sky and the sand as shown by peaks 620 and 630.

Figure 7:
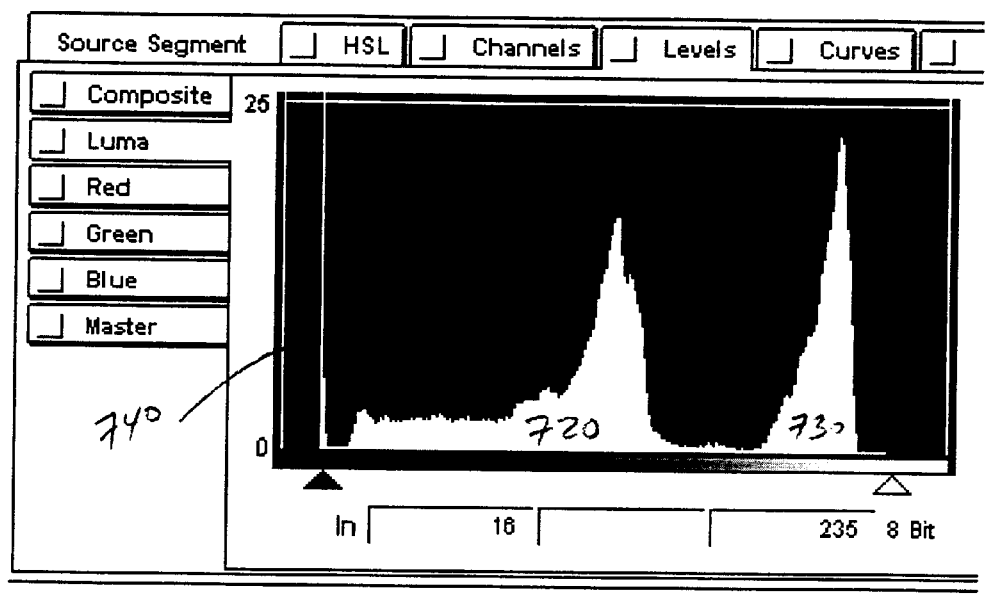
FIG. 7 is a histogram of the color components associated with the image of FIG. 5 according to the present invention.

Referring now to FIG. 7, which depicts a histogram 700 of the color components, associated with the image 500. The shape of the histogram in FIG. 7 is of course the same as FIG. 6, but the histogram window in FIG. 7 has been rescaled, according to the present invention, to better emphasize the peaks at 720 and 730 rather than the spike at 740. Furthermore, the grid has been resized within the window to show primarily the 25-percentile information of the histogram.

The values for a spike tolerant histogram are generated according to the following pseudo code where Image [ImageWidth, ImageHeight] is an image of luma values, L is the array of histogram values to be calculated and Scale-Factor is used to scale the values and the grid.

1. Initialize the Histogram Data

```
For (i=0, i<256, i++)
    L[i]=0;
```

2. Count the number of luma values

```
For (y=0, y<ImageHeight, y++)
    For (x=0, x<Imagewidth, x++)
        L[ Image[x,y].lum ]++;
```

3. Find the top two values in the array

```
L_max = 0;
L_second = 0;
For (i=0, i<256, i++)
   Begin
      temp = L[i];
      If (temp>L_max)
         Begin
            L_second = L_max;
            L_max = temp;
         End
      Else
      If (temp>L_second)
            L_second = temp;
   End
```

4. Calculate the Scale Values

```
If (L_max > 0) And (L_second > 0)
   Begin
      If (L_second * 1.1 <L_max)
         ScaleFactor = 1.0 / (L_second * 1.1);
      Else
         ScaleFactor = 1.0 / (L_max * 1.1);
   End
Else
   ScaleFactor = 1.0;
```

It should be understood that the present invention might be implemented with a general-purpose computer system designed to execute computer software. The computer system may include a main unit connected to both an output device, which displays information to a user, and an input device, which receives input from a user. The main unit may include a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD) and other video output devices, printers, communication devices such as a modem, storage devices such as disk or tape, and audio output. It should also be understood that one or more input devices may be connected to the computer system.

Example input devices include a keyboard, keypad, track ball, mouse, pen and tablet, communication device, and data input devices such as audio and video capture devices. It should be understood that the invention is not limited to the particular input-or output devices used in combination with the computer system or to those described herein.

The computer system may be a general-purpose computer system, which is programmable using a computer programming language, such as C++, JAVA or other language, such as a scripting language or even assembly language. An example computer system is the Infinite Reality computer system from Silicon Graphics, Inc. The computer system may also be specially programmed, special purpose hardware, or an application specific integrated circuit (ASIC). In a general purpose computer system, the processor is typically a commercially available processor, of which the series x86 and Pentium series processors, available from Intel, and similar devices from AMD and Cyrix, the 680X0 series microprocessors available from Motorola, the PowerPC microprocessor from IBM and the Alpha-series processors from Digital Equipment Corporation, and the MIPS microprocessor from MIPS Technologies are examples. Many other processors are available. Such a microprocessor executes a program called an operating system, of which WindowsNT, Windows 95 or 98, IRIX, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system defines computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or a combination of the three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that invention is not limited to a particular computer platform, particular processor, or particular high-level programming language. Additionally, the computer system may be a multiprocessor computer system or may include multiple computers connected over a computer network. It should be understood that each module or step shown in the accompanying figures may correspond to separate modules of a computer program, or may be separate computer programs. Such modules may be operable on separate computers.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for displaying a collection of data points in a window on a computer system, said method comprising the steps of:
   generating said data points;
   comparing said data points and determining if the largest of said data points significantly exceeds the other data points;
   calculating a scaling factor for displaying said data points in response to whether the largest data point significantly exceeds said other data points;
   displaying said data points in response to said calculated scaling factor.

2. The method of claim 1 wherein said step of comparing said data points includes the step of determining if said largest data point exceeds the other data points by a factor of at least 1.1.

3. The method of claim 1 wherein the step of displaying said data points includes the step of displaying said data points as a graph in said window of said computer system.

4. The method of claim 3 wherein said step of displaying said data points as a graph includes the step of displaying said data points as a histogram graph.

5. The method of claim 3 wherein said step of calculating said scaling factor includes calculating said scaling factor in response to one of said data points other than said largest data point.

6. The method of claim 5 wherein said step of calculating said scaling factor in response to the second largest data point.

7. The method of claim 5 wherein said step of displaying said data points in response to said calculated scaling factor includes scaling said window according to said scaling factor so that the second largest data point extends a predetermined percentage of the vertical height of said window.

8. The method of claim 7 wherein said predetermined percentage is about 90%.

9. A method for scaling the display of a histogram in a window on a computer system, said method comprising the steps of:
   generating histogram values;
   comparing said histogram values and determining if the largest of said histogram values exceeds the other histogram values by a predetermined factor;
   scaling the display of the histogram in said window of the computer system in response to other than the largest histogram value if the largest of said histogram values exceeds any other selected histogram value by said predetermined factor.

10. The method of claim 9 wherein said predetermined factor is at least 1.1.

11. The method of claim 9 wherein said step of scaling the display includes determining a scaling factor that is not derived from the largest histogram value.

12. The method of claim 11 further including the step of displaying the histogram according to said scaling factor within said window of the computer system.

13. The method of claim 12 wherein the step of displaying the histogram includes providing one or more grid lines for identifying each histogram value as a percentage of said largest histogram value.

14. The method of claim 9 wherein said selected histogram value is the second largest histogram value.

15. A system for displaying a collection of data points in a window on a computer system, said method comprising the steps of:
   means for generating said data points;
   means for comparing said data points and determining if the largest of said data points significantly exceeds the other data points;
   means for calculating a scaling factor for displaying said data points in response to whether the largest data point significantly exceeds said other data points;
   means for displaying said data points in response to said calculated scaling factor.

16. The system of claim 15 wherein said means for comparing said data points includes means for determining if said largest data point exceeds the other data points by a factor of at least 1.1.

17. The system of claim 15 wherein means for displaying said data points includes means for displaying said data points as a graph in said window of said computer system.

18. A system for scaling the display of a histogram in a window on a computer system, said method comprising the steps of:
   means for generating histogram values;
   means for comparing said histogram values and determining if the largest of said histogram values exceeds the other histogram values by a predetermined factor;
   means for scaling the display of the histogram in said window of the computer system in response to other than the largest histogram value if the largest of said histogram values exceeds any other selected histogram value by said predetermined factor.

19. The system of claim 18 wherein said predetermined factor is at least 1.1.

20. The system of claim 18 wherein said means for scaling the display includes means for determining a scaling factor that is not derived from the largest histogram value.

21. The system of claim 20 further includes means for displaying the histogram according to said scaling factor within said window of the computer system.

22. The system of claim 21 wherein means for displaying the histogram includes means for providing one or more grid lines for identifying each histogram value as a percentage of said largest histogram value.

23. The system of claim 18 wherein said selected histogram value is the second largest histogram value.

* * * * *